United States Patent [19]
Hamatani

[11] Patent Number: 4,940,313
[45] Date of Patent: Jul. 10, 1990

[54] LIQUID CRYSTAL DISPLAY HAVING A BUILT-IN PHOTOELECTRIC CONVERSION DEVICE

[75] Inventor: Toshiji Hamatani, Atsugi, Japan

[73] Assignee: Semiconductor Energy Laboratory Co., Ltd., Atsugi, Japan

[21] Appl. No.: 381,427

[22] Filed: Jul. 18, 1989

[30] Foreign Application Priority Data

Jul. 19, 1988 [JP] Japan .................................. 63-179468

[51] Int. Cl.$^5$ ............................................. G02F 1/133
[52] U.S. Cl. ..................................... 350/342; 350/345
[58] Field of Search ........................ 350/334, 342, 345

[56] References Cited

U.S. PATENT DOCUMENTS

| | | | |
|---|---|---|---|
| 4,277,145 | 7/1981 | Hareng et al. | 350/342 |
| 4,538,884 | 9/1985 | Masaki | 350/342 |
| 4,693,561 | 9/1987 | Ashley | 350/342 |
| 4,826,293 | 5/1989 | Grinberg et al. | 350/342 |

OTHER PUBLICATIONS

Benjamin Kazan, "Liquid Crystal Display with Power Amplification", Xerox Disclosure Journal, vol. 5, No. 5, Jul./Aug. 1980, p. 409.

Primary Examiner—Stanley D. Miller
Assistant Examiner—Anita Pellman Gross
Attorney, Agent, or Firm—Sixbey, Friedman Leedom & Ferguson

[57] ABSTRACT

An improved liquid crystal display incorporates a photoelectric conversion device in order to provide a display suitable for a lap-top personal computer system such as a wordprocessor. The display is provided with a fluorescent lamp for illuminating the display area from the behind of the liquid crystal display. The light rays emitted from the lamp which are not directed to the display area but toward the opposite direction are collected by the conversion device.

6 Claims, 5 Drawing Sheets

LIQUID CRYSTAL DISPLAY HAVING A BUILT-IN PHOTOELECTRIC CONVERSION DEVICE

BACKGROUND OF THE INVENTION

The present invention relates to a liquid crystal display having a built-in photoelectric conversion device.

Liquid crystal displays have been broadly used due to the advantages of their energy saving construction and light-weight compact structure. Particularly, these displays are suitable for lap-top personal computors or wordprocessors. There are two types of liquid crystal display devices, i.e. the reflective type and the transmissive type. In the construction of the reflective type, light enters into the liquid crystal layer from the front surface of the display on which visual images are constructed. The incident light is reflected on the rear side of the liquid crystal layer and then emitted from the front surface after modulated through the liquid crystal layer. In the construction of the transmissive type, light enters from the rear surface of the liquid crystal layer and exits from the front surface thereof. Usually, a light source is provided in the rear side of the liquid crystal layer in order to supply light rays to the liquid crystal display in this case.

The transmissive type is advantageous as compared with the reflective type in that the light source employed in the transmissive type can make the images bright and clear and can make it possible to construct colour images which can not be realized in case of the reflective type because of lack of sufficient brightness. However, the provision of the light source makes the display expensive and heavy.

SUMMARY OF THE INVENTION

It is therefore an object of the present invention to provide a cheap liquid crystal display capable of producing bright images.

In order to accomplish the above and other objects and advantages, a liquid crystal display and a photoelectric conversion device are formed with a built-in photoelectric conversion device. The liquid crystal display and the photoelectric conversion device are formed to share common components.

BRIEF DESCRIPTION OF THE DRAWING

This invention can be better understood from the following detailed description when read in conjunction with the drawing in which.

DETAILED DESCRIPTION OF THE PREFERRED EMBODIMENTS

Figure 1:
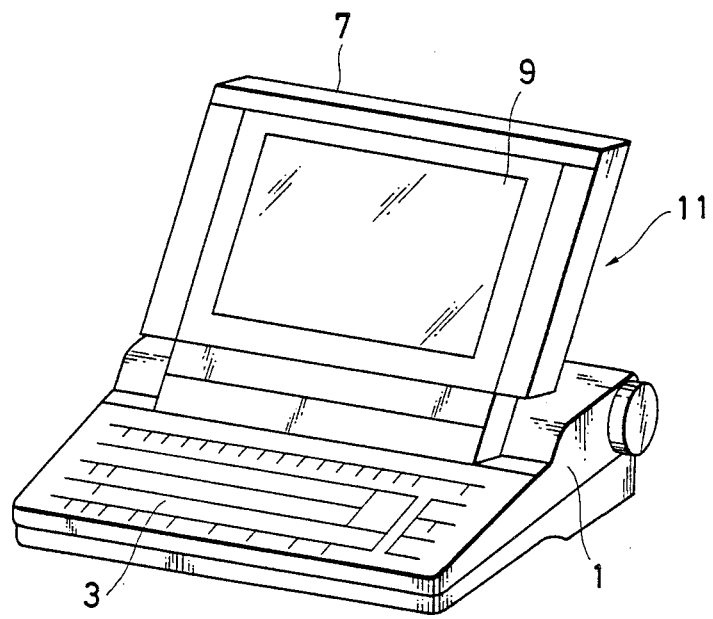
FIG. 1 is a perspective view showing a wordprocessor provided with a liquid crystal display in accordance with the present invention when the display is in its opened position.
Figure 2:
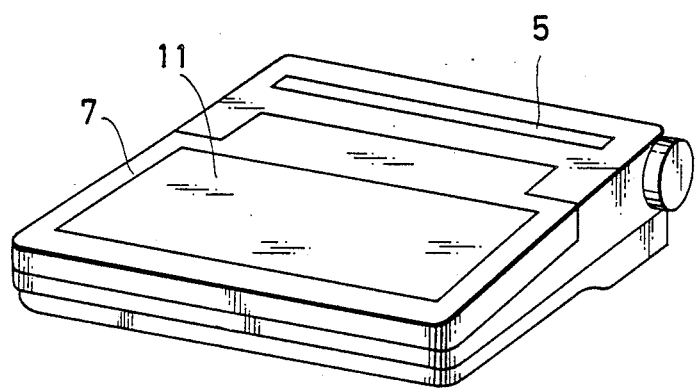
FIG. 2 is a perspective view showing a wordprocessor provided with a liquid crystal display in accordance with the present invention when the display is in its closed position.

Referring now to FIGS. 1 and 2, a wordprocessor of lap-top type provided with a liquid crystal display in accordance with the present invention is illustrated. The wordprocessor comprises a processer frame 1, a key board 3, and a display board 7 pivotally fixed to the frame 1. The display board functions as a lid of the computer system. In the open position of the display board, the display area 9 formed in the inner side of the display board 3 is errected as shown in FIG. 1 in order to enable the operation of the wordprocessor. In the closed position, as shown in FIG. 2, the external side of the display board 7 becomes the upper side. The rear side is provided with a photoelectric conversion device 11. The conversion device can convert the incident light into electricity and accumulate the electric energy by means of a secondary cell which is not shown in FIGS. 1 and 2. Reference numeral 5 designates a built-in printer.

Figure 3:
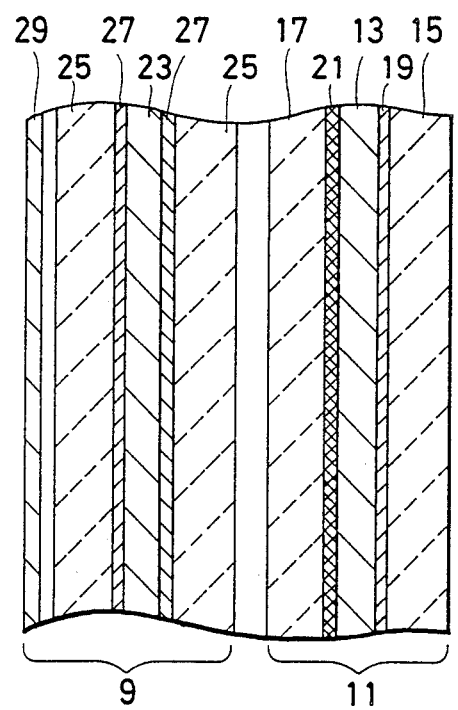
FIG. 3 is a cross sectional view showing the internal structure of a reflective type liquid crystal display in accordance with the present invention.

FIG. 3 is a cross section of the display board 7. The liquid crystal display 9 comprises a pair of transparent glass substrates 25, electrode arrangements 27 formed in the inside surfaces of the substrates 25, a ferroelectric liquid crystal layer 23 interposed therebetween, and a polarizing plate 29. The electrode arrangements 27 define a plurality of pixels in matrix form in order to apply electric fields thereto. The photoelectric conversion device 11 in turn comprises a transparent glass substrate 17, a reflective electrode 21 made of a metal such as Al, Cr and Mo, a photoelectric convertion semiconductor film 13 made of an amorphous silicon semiconductor, a transparent electrode made of ITO, and an external glass plate 15.

Light enters the structure from the left side of the glass substrate 25 and is reflected on the reflective electrode 21 of the photoelectric conversion device 11. Images can be constructed through the modulation of the incident light by passing through the polarizing plate 29 and the liquid crystal layer 23. It should be noted that, in the reflective type constuction of the liquid crystal display 9, the reflective plate has been dispensed with.

Figure 4:
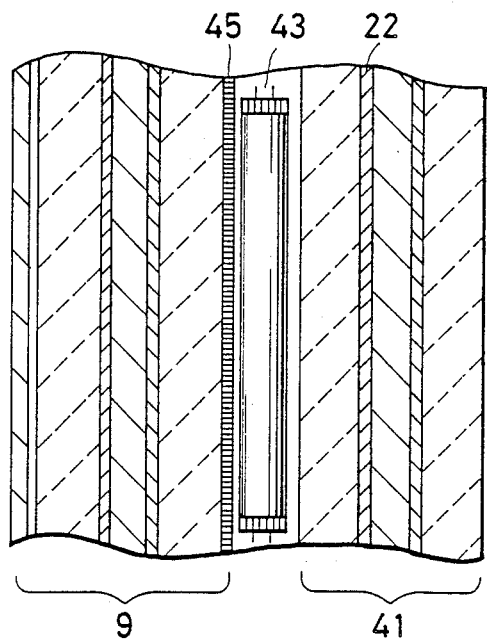
FIG. 4 is a cross sectional view showing the internal structure of a transmissive type liquid crystal display in accordance with the present invention.

FIG. 4 illustrates the display board 7 when constructed into the transmissive type. The construction of the liquid crystal device 9 is similar to that illustrated in FIG. 3 except for the provision of a light-scattering plate 45 behind the inner substrate 25. The light-scattering plate 45 may be made of an organic sheet or a frosted glass pane. The photoelectric conversion device 41 is also similar to that illustrated in FIG. 3 except that a transparent electrode 22 is provided in place of the reflective electrode 21. In addition, a fluorescent lamp 43 is provided between the liquid crystal display 9 and the photoelectric conversion device 41.

The combination of the liquid crystal display 9 and the lamp 43 is the same as the construction of a usual transmissive type liquid crystal display arrangement. Light emitted from the lamp 43 is made white and uniform by passing through the light-scattering plate 45 and modulated by the liquid crystal layer and the polarizing plate. The construction shown in FIG. 4 is, however, adapted to collect the energy of the light rays going away from the liquid crystal display by means of the photoelectric conversion device 41. Of course, the conversion device 41 functions also to collect light incident from the external side.

Figure 5:
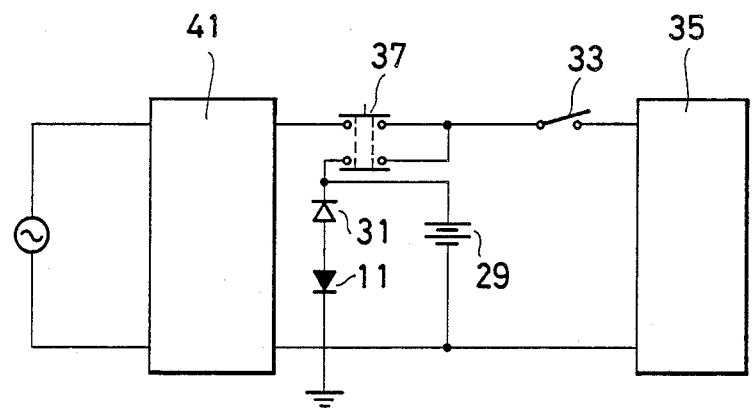
FIG. 5 is a circuit diagram showing the driving circuit of a liquid crystal display in accordance with the present invention.

FIG. 5 is a circuit diagram for explaining the driving operation of the liquid crystal display shown in FIG. 3 or FIG. 4. Reference numeral 35 designates the driving circuit for the liquid crystal display. The driving circuit is adapted to supply appropriate addressing signals to the electrode arrangements 27 in order to construct desired images thereon. Reference numeral 33 designates a switch 33 by which the driving circuit 35 is turned on. The energy is supplied selectively, by means of a dual switch 37, from the photoelectric conversion device 11 associated with a secondary cell 29, or an AC power source 30, e.g. the line supply, through a rectifier 41. The dual switch 37 opens, in one position, the connection between the driving circuit 35 and the AC source 30 and closes the connection between the photoelectric conversion device 11 and the driving circuit 35 at the same time. In the other position, the dual switch 37 closes the connection between the driving circuit 35 and the AC source 30 and opens the connection between the photoelectric conversion device 11 and the driving circuit 35 at the same time. When the wordprocessor is not used, the electricity generated from the conversion device 11 is accumulated in the secondary cell 29 through the rectifying diode 31.

While several embodiments have been specifically described by way of examples, it is to be appreciated that the present invention is not limited to the particular examples described and that modifications and variations can be made without departing from the scope of the invention as defined by the appended claims. Some examples are as follow. For example, although the example is the display for a wordprocessor, the present invention can be applied for forming the display devices of general computer system, e.g. lap-top personal computer systems. Colour images can be constructed by making use of a colour filter.

What is claimed is:

1. A liquid crystal display comprising:
   a pair of first transparent substrates;
   transparent electrode arrangements provided on the inside surfaces of said transparent substrates in order to define a plurality of pixels;
   a liquid crystal layer disposed between said substrates;
   a transparent second substrate overlappingly juxtaposed parallel with said transparent first substrates; and
   a photoelectric conversion device formed on said transparent second substrate, said conversion device comprising a pair of conductive films and photosensitive semiconductor film interposed therebetween, one of said conductive films closer to said first substrates being reflective and the other being transparent.

2. The display of claim 1 wherein said reflective conductive film is made from a metal.

3. The display of claim 2 wherein said metal is Al, Cr or Mo.

4. The display of claim 1 adapted for a personal computer system.

5. A liquid crystal display comprising:
   a pair of first transparent substrates;
   transparent electrode arrangements provided on the inside surfaces of said transparent substrates in order to define a plurality of pixels;
   a liquid crystal layer disposed between said substrates;
   a transparent second substrate overlappingly juxtaposed parallel with said transparent first substrates;
   a photoelectric conversion device formed on said transparent second substrate, said conversion device comprising a pair of transparent conductive films and photosensitive semiconductor film located therebetween; and
   a light source provided between said first substrates and said second substrate.

6. The display of claim 5 further comprising a light-scattering plate disposed between said light source and said first transparent substrates.

* * * * *